US010436277B2

(12) United States Patent
Hafez et al.

(10) Patent No.: US 10,436,277 B2
(45) Date of Patent: Oct. 8, 2019

(54) DEVICE FOR HAPTIC INTERFACE WITH REDUCED NO-LOAD TORQUE

(71) Applicant: COMMISSARIAT A L'ENERGIE ATOMIQUE ET AUX ENERGIES ALTERNATIVES, Paris (FR)

(72) Inventors: Moustapha Hafez, Palaiseau (FR); Gwenael Changeon, Palaiseau (FR); Jose Lozada, Palaiseau (FR); Laurent Eck, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 72 days.

(21) Appl. No.: 15/514,733

(22) PCT Filed: Sep. 29, 2015

(86) PCT No.: PCT/EP2015/072318
§ 371 (c)(1),
(2) Date: Mar. 27, 2017

(87) PCT Pub. No.: WO2016/050719
PCT Pub. Date: Apr. 7, 2016

(65) Prior Publication Data
US 2018/0231093 A1    Aug. 16, 2018

(30) Foreign Application Priority Data

Sep. 29, 2014 (FR) ...................................... 14 59183

(51) Int. Cl.
*F16F 9/53* (2006.01)
*H01H 19/14* (2006.01)
(Continued)

(52) U.S. Cl.
CPC ............... *F16F 9/535* (2013.01); *G05G 5/03* (2013.01); *G06F 3/016* (2013.01); *G06F 3/0338* (2013.01);
(Continued)

(58) Field of Classification Search
None
See application file for complete search history.

(56) References Cited

U.S. PATENT DOCUMENTS 4,456,396 A * 6/1984 Damratowski ......... F16D 1/092
29/252
5,462,080 A * 10/1995 Plavidal .............. F16K 27/0218
137/315.22

(Continued)

FOREIGN PATENT DOCUMENTS

FR     2 930 655 A1    10/2009
WO   2015/033034 A1    3/2015

OTHER PUBLICATIONS

U.S. Appl. No. 14/407,302, filed Dec. 11, 2014, US 2015/0162853 A1, Edouard Leroy et al.

(Continued)

*Primary Examiner* — Chico A Foxx
(74) *Attorney, Agent, or Firm* — Oblon, McClelland, Maier & Neustadt, L.L.P.

(57) ABSTRACT

A device for a rotary haptic interface including: a rotary button and an interaction member interacting with a magnetorheological fluid, the rotary button and interaction member being secured to a shaft for rotation therewith, a chamber defined by walls and containing the fluid and the interaction element, and a mechanism generating a variable magnetic field. The element for interaction with the fluid includes a skirt surrounding the shaft, the skirt being secured to a longitudinal end of the shaft opposite the end to which the rotary button is secured, and extending from the first end (Continued)

US 10,436,277 B2

Page 2 towards the rotary button. The shaft passes through a single wall of the chamber and a sealing mechanism is arranged between the shaft and the wall. A mechanism for guiding the rotation of the shaft is arranged around the shaft between the sealing mechanism and the rotary button.

20 Claims, 2 Drawing Sheets

(51) Int. Cl.
| | |
|---|---|
| *G06F 3/01* | (2006.01) |
| *H01H 19/00* | (2006.01) |
| *G06F 3/0338* | (2013.01) |
| *G05G 5/03* | (2008.04) |
| *H01H 3/00* | (2006.01) |
| *G05G 1/08* | (2006.01) |

(52) U.S. Cl.
CPC ............ *H01H 19/00* (2013.01); *H01H 19/14* (2013.01); *F16F 2224/045* (2013.01); *G05G 1/08* (2013.01); *G06F 2203/015* (2013.01); *H01H 2003/008* (2013.01)

(56) References Cited

U.S. PATENT DOCUMENTS

| | | | | |
|---|---|---|---|---|
| 7,764,268 | B2 * | 7/2010 | Gomez | G06F 3/016 |
| | | | | 345/156 |
| 8,013,847 | B2 * | 9/2011 | Anastas | G06F 3/016 |
| | | | | 345/184 |
| 8,441,433 | B2 * | 5/2013 | Olien | G06F 3/0362 |
| | | | | 345/156 |
| 9,268,356 | B2 * | 2/2016 | Burleson | G05G 1/10 |
| 9,410,588 | B2 * | 8/2016 | Shimura | F16D 63/002 |
| 2002/0057152 | A1 | 5/2002 | Elferich et al. | |
| 2003/0006958 | A1 * | 1/2003 | Onodera | B60K 37/06 |
| | | | | 345/156 |
| 2003/0079948 | A1 | 5/2003 | Jolly et al. | |
| 2005/0126871 | A1 | 6/2005 | Jolly et al. | |
| 2006/0025693 | A1 * | 2/2006 | Sano | A61B 5/02141 |
| | | | | 600/490 |
| 2006/0280575 | A1 * | 12/2006 | Ruettiger | B60K 37/06 |
| | | | | 411/15 |
| 2007/0279401 | A1 * | 12/2007 | Ramstein | G06F 3/016 |
| | | | | 345/184 |
| 2008/0118196 | A1 * | 5/2008 | Watanabe | F04B 27/1063 |
| | | | | 384/492 |
| 2011/0181405 | A1 | 7/2011 | Periquet et al. | |
| 2012/0264579 | A1 * | 10/2012 | Klein | A63B 22/0015 |
| | | | | 482/146 |
| 2015/0061548 | A1 * | 3/2015 | Furuki | H02P 25/032 |
| | | | | 318/114 |
| 2015/0136548 | A1 * | 5/2015 | Shimura | F16D 63/002 |
| | | | | 188/267.2 |

OTHER PUBLICATIONS

U.S. Appl. No. 14/408,771, filed Dec. 17, 2014, US 2015/0301553 A1, Carlos Rossa et al.
International Search Report dated Dec. 8, 2015 in PCT/EP2015/072318 filed Sep. 29, 2015.
French Search Report dated Jun. 12, 2015 in FR1459183 filed Sep. 29, 2014.

* cited by examiner

DEVICE FOR HAPTIC INTERFACE WITH REDUCED NO-LOAD TORQUE

FIELD OF THE INVENTION AND STATE OF THE RELATED ART

The present invention relates to a device for a haptic interface with a reduced no-load torque and to a haptic interface comprising such a device.

A haptic interface can take the form of a rotary button operated by a user, in this case, the interface opposes a torque resisting the user according to the angular position of the actuation button and the movement applied by the user, thus making it possible to define haptic patterns which will be perceived by the user when turning the button.

The resistant torque can be transmitted to the button via a magnetorheological fluid, the apparent viscosity whereof is modified by applying a magnetic field in order to define the predefined haptic patterns.

In order to render the haptic sensation as accurate as possible, it is sought to produce haptic interfaces with a reduced no-load torque.

A rotary haptic interface with magnetorheological fluid according to the prior art comprises a button secured to an element immersed in a magnetorheological fluid, a magnetic field is applied to the fluid, the apparent viscosity whereof varies. The fluid is stored in a chamber, the shaft is guided in rotation about the axis thereof by means of bearings situated on either side of the element for interacting with the fluid. In order to ensure tightness between the shaft and the chamber and isolate the bearings from the magnetorheological fluid, two tightnesses are to be produced between the shaft and the walls of the chamber. The tightnesses are obtained with tightly mounted seals. The haptic interface then has a significant no-load torque.

DESCRIPTION OF THE INVENTION

Consequently, one aim of the present invention is that of providing a device for a haptic interface with a reduced no-load torque.

The aim mentioned above is achieved by a device for a haptic interface comprising a member for interacting with the user and a member for interacting with a fluid, the apparent viscosity whereof varies according to a control stimulus, the member for interacting with the user and the member for interacting with the fluid being secured to a shaft movable about the longitudinal axis thereof for rotation therewith, said element for interacting with the fluid being arranged in a chamber containing said fluid, the device also comprising means for generating a variable stimulus for example a variable magnetic field in the case of a magnetorheological fluid. The element for interacting with the fluid has at least one interaction skirt secured to a longitudinal end of the shaft opposite the end to which the member for interacting with the user is secured and the skirt extends about the shaft towards the member for interacting with the user. The shaft passes through a single wall of the chamber, said passage being tight and implementing a sealing means. The interface also comprises means for guiding the rotation of the shaft arranged between the sealing means and the member for interacting with the user.

The implementation of a single sealing means makes it possible to reduce the no-load torque.

In other words, the orientation of the element for interacting with the fluid and the relative arrangement of this element and the means for guiding rotation make it possible to only use a single seal to ensure the tightness of the chamber and protect the means for guiding the fluid.

This relative arrangement makes it possible to retain the positioning margins of the elements of the device for interacting with the fluid.

This relative arrangement further has the advantage of being compact.

Particularly advantageously, the guiding means are situated so as to be substantially aligned with the element for interacting with the fluid in a plane orthogonal to the shaft. Very good guidance of the rotation and reduced overall dimensions are obtained using the volume inside the element for interacting with the fluid. The interface then further has a high dynamic range, the ratio between nominal braking torque available and the no-load torque being maximised without impacting the overall dimensions of the interface.

A haptic interface is thus obtained with a reduced no-load torque, while maintaining the braking performances of the device and the retention of the overall dimensions.

In one advantageous embodiment, the guiding means have a low swivelling angle, for example they are formed by a needle roller cage.

Preferably, the means generating the variable stimulus are arranged inside the element for interacting with the fluid, which makes it possible to obtain an increased maximum braking torque while retaining the compact size of the chamber.

In one preferred example, in the case of a magnetorheological fluid, the chamber is formed in part in two magnetic cores guiding the magnetic field.

As such, the subject-metter of the present invention is a device for a rotary haptic interface comprising:
  a member for interacting with the user,
  a member for interacting with a fluid, the apparent viscosity whereof varies according to a control stimulus,
  a shaft suitable for rotating about the axis thereof, the member for interacting with the user and the member for interacting with the fluid being secured to said shaft for rotation therewith,
  a fluid, the apparent viscosity whereof varies according to a control stimulus,
  a chamber defined by walls and containing said fluid, said element for interacting with the fluid being arranged in said chamber in contact with the fluid,
  means for generating a variable stimulus in the fluid,
  the element for interacting with the fluid comprising at least one movable interaction wall surrounding the shaft, said interaction wall being secured to a longitudinal end of the shaft opposite the end to which the element for interacting with the user is secured, and extending from said first end towards the element for interacting with the user,
  the shaft passing through a single wall of the chamber,
  a sealing means being arranged between the shaft and said wall so as to form a tight passage,
  means for guiding the rotation of the shaft arranged about the shaft between the sealing means and the element for interacting with the user.

Very advantageously, the means for guiding rotation are positioned inside the element for interacting with the fluid facing the interaction wall. Preferably, the means for guiding rotation have a low rolling angle, the means for guiding rotation advantageously comprising a needle roller cage.

The means for generating a variable stimulus are advantageously arranged at least in part in a space defined inside the interaction wall of the element for interacting with the fluid.

For example, the means for generating a variable stimulus are means for generating a variable magnetic field and the fluid is a magnetorheological fluid. For example, the means for generating a variable magnetic field comprise a coil and at least one magnetic core, said coil being arranged in the space defined inside the interaction wall of the element for interacting with the fluid.

Preferably, the means for generating a variable magnetic field comprise an inner magnetic core arranged in the coil and an outer magnetic core arranged outside the coil, said inner and outer magnetic cores defining at least in part the chamber, the coil being arranged so as to be facing a part of the interaction wall.

For example, the coil is mounted between a shoulder of the inner magnetic core and a bearing surface of the outer magnetic core.

The inner core can have an annular shape and comprise a through passage wherein the shaft is mounted, the sealing means ensuring tightness between the shaft and the through passage.

For example, the means for guiding rotation are mounted in the through passage of the inner magnetic core.

Advantageously, the sealing means is mounted in a groove formed in the shaft.

The chamber can comprise a wall arranged opposite the wall traversed by the shaft and formed by a closing plate secured in a removable manner.

Advantageously, the element for interacting with the fluid comprises at least two concentric interaction walls. The device can then comprise a fixed interaction wall with respect to the chamber and inserted between the at least two concentric movable interaction walls, said fixed interaction wall being concentric to the movable interaction walls.

Preferably, the fixed wall is secured to a transverse insert made of a magnetic material.

The element for interacting with the fluid can comprise an end perpendicular to the shaft and whereby the interaction wall is secured to the shaft, said end being advantageously made of amagnetic material. The end can comprise at least one through hole intended to discharge the overflow and/or facilitate filling.

Another subject-matter of the present invention is a rotary haptic interface comprising a device according to any one of the preceding claims, means for measuring a characteristic of a rotary movement of the element for interacting with the user, a control unit comprising haptic patterns, said control unit being connected to the measurement means and the means for generating a variable stimulus, and are suitable for generating an order to the means for generating a variable stimulus according to the pattern selected on the basis of the signal emitted by the measurement means. The measurement means comprise for example an angular position sensor.

BRIEF DESCRIPTION OF THE FIGURES

The present invention will be understood more clearly on the basis of the following description and the appended figures wherein.

DETAILED DESCRIPTION OF PARTICULAR EMBODIMENTS

In the description hereinafter, the example of a haptic interface using a magnetorheological fluid, i.e. the apparent viscosity whereof varies according to the magnetic field applied, will be described but the use of an electrorheological fluid, i.e. a fluid wherein the apparent viscosity is dependent on the electrical field applied, is not outside the scope of the present invention.

Figure 1:
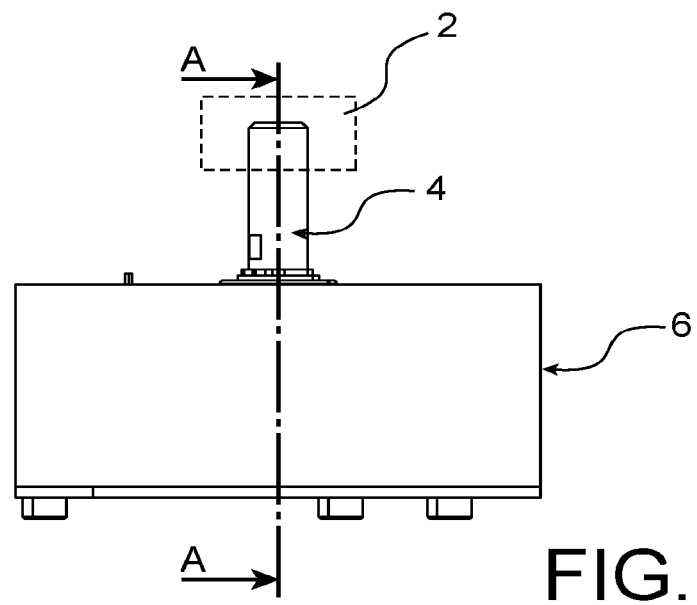
FIG. 1 is a side view of an example of an embodiment of a haptic interface.
Figure 2:
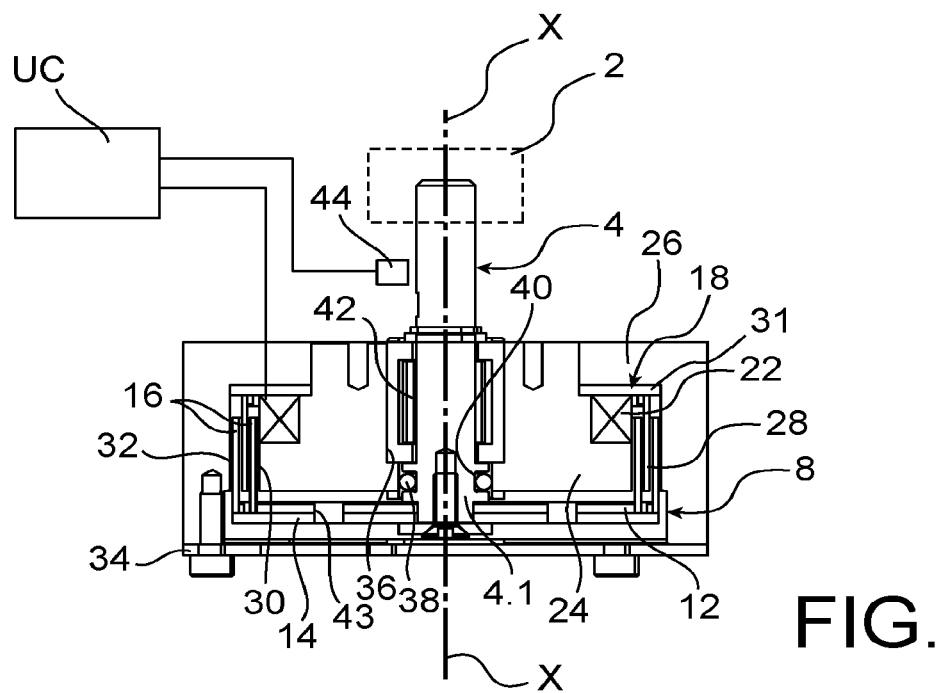
FIG. 2 is a sectional view along the plane A-A of the interface in FIG. 1.

In FIGS. 1 and 2, an example of an embodiment of a haptic interface with a rotary button can be seen. The interface comprises a button 2 (represented with a dotted line) intended to be operated by an operator, a shaft 4 whereof the button 2 is secured for rotation therewith and a casing or housing 6 wherein the shaft 4 is rotatably mounted. The shaft 4 has a longitudinal axis X about which it is suitable for rotating.

In FIG. 2, the interior of the housing 6 can be seen.

The interface also comprises an interaction element 8 for interacting with a magnetorheological fluid, the fluid and the interaction element are contained in a tight chamber 12 in the housing 6. This element 8 is also secured to the shaft 4 and therefore to the rotary button 2 for rotation therewith.

The interaction element 8 comprises a disk-shaped bottom 14 and one or a plurality of peripheral walls 16 or skirt having a circular cross-section extending along the axis X. The peripheral walls or skirts are intended to interact with the fluid, they can be denoted hereinafter as "interaction wall". Preferably, the bottom is made of a magnetic material. In the example represented, the interaction element comprises two concentric interaction walls and a tubular element 28 secured to the housing is inserted between the two interaction walls 16, this contributes to the shearing effect of the magnetorheological fluid when the interaction walls 16 are rotating. The interaction walls interact with the fluid and are more or less braked by the shearing forces appearing between the peripheral walls and the fluid. The bottom forms a supporting member for the skirts.

The use of a plurality of interaction walls makes it possible to increase the braking torque while limiting the dimensions.

A device wherein the element for interacting with the fluid only comprised one interaction wall and no tubular element is not outside the scope of the present invention.

The end 14 is secured to a longitudinal end 4.1 of the shaft 4 situated in the chamber 4. The end 14 extends substantially perpendicularly to the longitudinal axis X. In the example represented and advantageously, the end 14 is held by screwing on the shaft 4, for example by means of a driving square enabling the transmission of the braking torque.

The interaction walls 16 extend from the bottom towards the rotary button 2. The element for interacting with the fluid then substantially has the shape of an inverted bell, the bottom 14 forming the lower part in the representation in FIG. 2. It will be understood that the orientation of the interface will not be involved in the operation thereof.

Alternatively, the element 8 can only comprise one interaction wall or more than two concentric interaction walls. Moreover, the interaction walls(s) could comprise slots and/or protruding or hollow portions in order to increase the resistance to movement. The interaction walls 16 of the element 8 can be made of a magnetic or a magnetic material.

The haptic interface comprises means for generating a variable magnetic field 18. In the example represented, they comprise an electromagnet comprising a coil 22 and magnetic cores 24, 26. The coil 22 has an axis aligned with the axis aligned with the axis X.

The assembly comprising the housing, the fluid and the means for generating a magnetic field forms a magnetorheological brake for the assembly comprising the rotary button, the shaft and the element for interacting with the fluid.

Advantageously, the coil is arranged inside the element for interacting with the fluid, and opposite the end 14, which makes it possible to have a large diameter interaction wall along with a magnetic flux generated by the coil which passes over a large surface area through the shearing zone of the interaction walls, which increases the braking torque applied to the shaft and to the rotary button and thus increases the sensation by the user.

Preferably, the inner and outer side walls of the tight chamber are formed directly by the magnetic cores guiding the magnetic field.

The coil is connected to a current power supply controlled by a control unit UC according to the operation of the button and pre-recorded patterns. The connection wires pass for example through the outer magnetic core 26.

The magnetic core 24 is arranged in the coil 22 and forms an inner side wall 30 of the chamber, it will be referred to as "inner magnetic core". The other magnetic core 26 is arranged outside the coil and forms an outer side wall 32 of the chamber, it will be referred to as "outer magnetic core". In the example represented, the two side walls 30, 32 are tubular and concentric. The skirts 16 are arranged in the space between the inner 30 and outer tubular walls 32.

The coil 22 is housed between a shoulder of the inner core 24 and an annular bearing surface of the outer core 26 so as to be facing a portion of the skirts 16. The coil 22 is arranged such that the magnetic flux generated passes through the zone of the chamber where the skirts 16 are situated.

The inner core 24 has an annular shape and comprises a through central passage 36, the shaft 4 being tightly mounted and suitable for pivoting in the central passage 36 of the inner core 24. By means of the invention, the shaft 4 only passes through one wall of the chamber and the tight assembly of the shaft in the chamber can be carried out using a single seal 38, for example an O-ring. The seal 38 is tightly mounted on the outer diameter thereof, in contact with the inner core, and sliding on the inner diameter thereof, in contact with the shaft. The use of a single seal makes it possible to reduce the no-load friction torque applied to the shaft 4. Furthermore, more advantageously, the seal 38 is mounted in a groove 40 formed in the shaft. The seal 38 is then in contact along a reduced diameter of the shaft 4, which makes it possible to reduce the no-load torque on the shaft further.

The chamber is closed at the bottom end thereof opposite that traversed by the shaft 4 by a closing plate 34 secured to the outer core 26, for example by screwing. The closing plate 34 is preferably made of amagnetic material.

In the example represented, the outer core 26 forms the outer wall of the housing but further embodiments can be envisaged.

The coil 22 is advantageously arranged such that a large surface area of the interaction walls is traversed by the magnetic field. Preferably, the coil 22 is situated in an upper zone or a lower zone with respect to the space between the inner 30 and outer tubular walls 32.

The magnetic cores are such that they guide the magnetic field through the interaction walls 16.

Advantageously, the tubular element 28 is secured to an annular insert 31 which is, in the example represented, clamped between the annular bearing surface of the outer magnetic core 26 and the shoulder of the inner magnetic core 24. Preferably, the annular insert 31 is made of amagnetic material.

Figure 3:
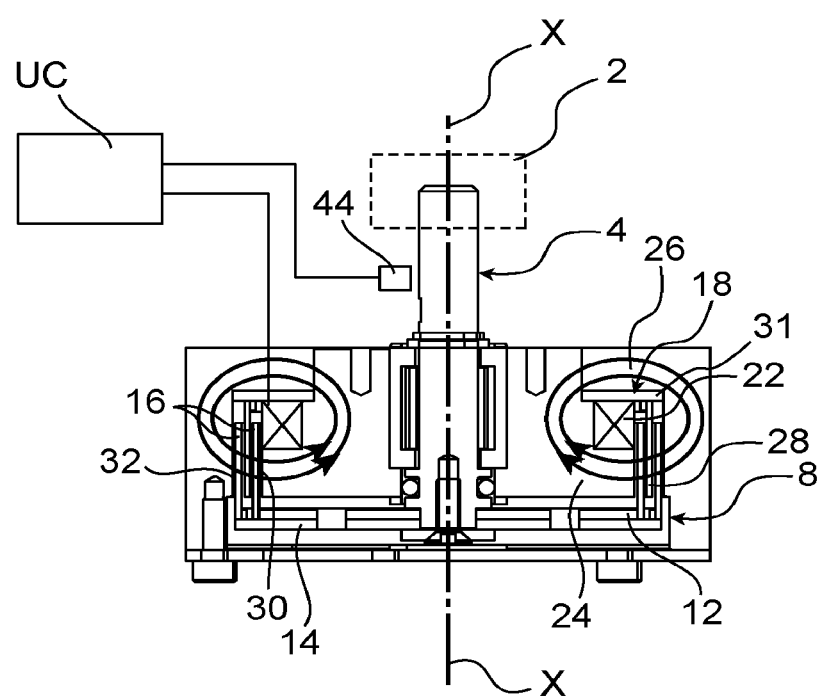
FIG. 3 is an identical view to that in FIG. 2 wherein the magnetic field lines generated by the means for generating a magnetic field are represented.

By making the bottom 14 of the element for interacting with the fluid and the annular insert 31 from amagnetic material, the upward and downward magnetic leaks in the representation in FIG. 3 are limited and the magnetic field is forced to pass through the peripheral wall 16 as represented schematically in FIG. 3.

Alternatively, the tubular element 28 could be embedded directly in the outer magnetic core 26 in the preferential case of use of an amagnetic material associated with the presence of slots for the tubular element 28. The tight chamber has, in a longitudinal section view, substantially a U shape corresponding to the longitudinal sectional shape of the element for interacting with the fluid, which reduces the volume of fluid required and reduces the space wherein a magnetic field is to be generated.

The interface also comprises guiding means 42 for guiding the rotation of the shaft about the axis X thereof. The guiding means are arranged between the seal 38 and the button outside the chamber in order to isolate same from the magnetorheological fluid, at least in part in the internal space defined by the inner tubular wall of the chamber.

In the example represented, the means for guiding rotation 42 are mounted in the through central passage 36 of the inner magnetic core 24.

The means for guiding rotation can be formed by a bearing, by one or more ball bearings and preferably by a needle roller cage which provides a reduced no-load torque. Furthermore, since it has a low swivelling angle, it enables satisfactory control of the coaxiality of the interaction walls, in reduced overall dimensions.

Moreover, the arrangement of the guiding means 42 as close as possible to the element for interacting with the fluid makes it possible to reduce the distance between the skirts 16 and the means for guiding rotation, reducing the swivelling effect and thus the risks of contact between the skirts 16 and the elements of the housing, for example the inner 30 and outer tubular walls 32 and the tubular element 28.

Furthermore, the arrangement thereof "inside the element for interacting with the fluid" makes it possible to save space by occupying the space situated inside the element for interacting with the fluid and as such provide a compact interface.

The chamber comprises zones which do not contribute to the braking of the element for interacting with the fluid, for example the zone situated between a free end of the skirts and the annular insert 31 and the zone situated between the end and the inner magnetic core 24. These zones can serve as a fluid store and/or volume compensation zone upon the expansion of the magnetorheological fluid.

Advantageously, the end comprises through orifices 43 for discharging the overflow and/or enabling additional filling of the chamber after fitting the element for interacting with the chamber.

The haptic interface also comprises at least one sensor 44 for measuring a characteristic of the movement of the rotary button, for example an angular position sensor. This is for example secured in part to the shaft 4 and can be formed by an optical wheel. The sensor(s) are connected to a control unit UC comprising a haptic pattern database, the control unit UC is in turn connected to the means for generating a magnetic field.

The operation of the haptic interface will now be described.

The user operates the rotary button 2 by pivoting same about the axis X, the element for interacting with the fluid 8 is also rotated. In the absence of a magnetic field, the user only perceives the no-load torque which is, by means of the invention, very low, merely due to a seal.

The movement of the rotary button 2 is detected by the sensor 44, for example a position sensor, which sends information on the movement of the button to a control unit UC. The control unit, on the basis of these signals, determines the haptic pattern to be applied and generates an order which is sent to the means for generating a magnetic field. This generates a magnetic field which is guided by the inner 24 and outer cores 26 and passes through the space between the inner 30 and outer tubular walls 32 increasing the apparent viscosity of the magnetorheological fluid, the shearing forces which are associated with the fluid, between the skirts 16 and the fixed walls 30, 32 of the chamber, and between the skirts 16 and the tubular element 28, increasing and opposing substantially the movement of the element for interacting with the fluid which is transmitted to the rotary button via the shaft, which generates a brake sensation perceived by the user.

The haptic pattern can be a brake sensation of varying intensity or then reproduces a stop.

The value of the magnetic field is continuously adapted according to the signals sent the sensors.

By means of the invention, the no-load torque is reduced which improves the reproduction of a free wheel type haptic pattern.

Furthermore, the stop reproduction can advantageously be improved as the haptic sensation can thus benefit from a greater load dynamic range. As a general rule, the haptic sensation of no-load operation of the button is perceived favourably by the user when the no-load torque is reduced.

Furthermore, the manufacture thereof is simplified.

Furthermore, in one embodiment wherein the electromagnetic is arranged inside the element for interacting with the fluid, it provides an increased maximum braking torque while having reduced overall dimensions.

By means of the orientation of the skirt(s) with respect to the end and to the shaft, it is possible to arrange the means for guiding rotation inside the skirt(s) while isolating same from the fluid, which improves the guidance by reducing the risks of contact between the skirt(s) and the fixed elements of the brake. Furthermore, the brake has a more compact design.

The haptic interface according to the invention is particularly suitable for an application in motor vehicles, for example to form an onboard haptic interface assisting the motor vehicle driver. It can enable the user to interact with the various vehicle equipment or accessories such as the GPS (Global Positioning System), radio, air conditioning, etc.

The invention claimed is:

1. A device for a rotary haptic interface comprising:
   a user interaction member for interacting with the user;
   a fluid interaction member for interacting with a fluid, apparent viscosity whereof varies according to a control stimulus;
   a shaft configured to rotate about the axis thereof, the user interaction member and the fluid interaction member being secured to the shaft for rotation therewith;
   a fluid, apparent viscosity whereof varies according to a control stimulus;
   a chamber defined by walls and containing the fluid, the fluid interaction member being arranged in the chamber in contact with the fluid;
   a magnetic field generator for generating a variable magnetic field in the fluid;
   the fluid interaction member comprising at least one movable interaction wall surrounding the shaft, the at least one interaction wall being secured to a first longitudinal end of the shaft opposite a second longitudinal end of the shaft to which the user interaction member is secured, and extending from the first end towards the user interaction member;
   the shaft passing through a single wall of the chamber;
   at least one seal being arranged between the shaft and the wall to form a tight passage;
   a guiding device for guiding rotation of the shaft arranged about the shaft between the sealing means and the user interaction member;
   the magnetic field generator comprising a coil arranged in the space defined inside the movable interaction wall of the fluid interaction member, an inner magnetic core arranged in the coil and an outer magnetic core arranged outside the coil, the inner and outer magnetic cores defining at least in part the chamber, the coil being configured to face a part of the at least one movable interaction wall, the outer magnetic core comprising a radial portion forming a transverse wall of the chamber and an axial portion forming an outer peripheral wall of the chamber.

2. A device according to claim 1, wherein the coil is configured to face a free end of the movable interaction wall opposite that secured to the first longitudinal end of the shaft.

3. A device according to claim 1, wherein the means for guiding rotation is positioned inside the fluid interaction member facing the at least one movable interaction wall.

4. A device according to claim 1, wherein the guiding device has a low swivelling angle.

5. A device according to claim 1, wherein the coil is mounted between a shoulder of the inner magnetic core and a bearing surface of the outer magnetic core.

6. A device according to claim 1, wherein the inner core has an annular shape and comprises a through passage wherein the shaft is mounted, the at least one seal means ensuring tightness between the shaft and the through passage.

7. A device according to claim 6, wherein the guiding device is mounted in the through passage of the inner magnetic core.

8. A device according to claim 1, wherein the at least one seal is mounted in a groove formed in the shaft.

9. A device according to claim 1, wherein the chamber comprises a wall arranged opposite the wall traversed by the shaft and formed by a closing plate secured in a removable manner.

10. A device according to claim 1, wherein the fluid interaction member comprises at least two concentric movable interaction wall.

11. A device according to claim 10, further comprising a fixed interaction wall with respect to the chamber and inserted between the at least two concentric movable interaction walls, the fixed interaction wall being concentric to the movable interaction walls.

12. A device according to claim 11, wherein the fixed wall is secured to a transverse insert made of a magnetic material.

13. A device according to claim 1, wherein the fluid interaction member comprises a bottom perpendicular to the shaft and whereby the movable interaction wall is secured to the shaft.

14. A device according to claim 1, wherein the bottom is made of a magnetic material.

15. A device according to claim 14, wherein the bottom comprises at least one through hole intended to discharge the overflow and/or facilitate filling.

16. A device according to claim 1, wherein the guiding device comprises a needle roller cage.

17. A rotary haptic interface comprising:
   a device according to claim 1;
   at least one sensor for measuring a characteristic of a rotary movement of the user interaction member;
   a control circuitry comprising haptic patterns, the control circuitry being connected to the at least one sensor and the magnetic field generator, and configured to generate an order to the magnetic field generator according to the pattern selected on the basis of the signal emitted by the at least sensor.

18. A haptic interface according to claim 17, wherein the at least one sensor comprises an angular position sensor.

19. A device according to claim 1, wherein the coil is positioned such that the coil faces one longitudinal end of the fluid interaction member.

20. A haptic interface according to claim 17, wherein the coil is positioned such that the coil faces one longitudinal end of the fluid interaction member.

* * * * *